United States Patent Office 3,218,285
Patented Nov. 16, 1965

3,218,285
MERCAPTO TRIAZOLES AS STABILIZERS FOR
POLYACRYLONITRILE COPOLYMERS
Carlhans Süling and Heino Logemann, Leverkusen, and
Ernst Roos, Cologne-Flittard, Germany, assignors to
Farbenfabriken Bayer Aktiengesellschaft, Leverkusen,
Germany, a corporation of Germany
No Drawing. Filed Aug. 1, 1962, Ser. No. 213,903
Claims priority, application Germany,
Aug. 9, 1961, F 34,649
6 Claims. (Cl. 260—32.6)

The present invention relates to a process for the production of acrylonitrile polymer solutions, which are only yellowed to a slight degree due to the presence of a stabiliser.

Yellowing always occurs in the production of acrylonitrile polymer solutions which are suitable for producing moulded articles. It is necessary to produce highly concentrated solutions, for which purpose long dissolving times and generally high dissolving temperatures are required.

It is already known to add stabilisers to solutions of acrylonitrile polymers in order, as far as possible, to avoid any yellowing occurring.

Thus, it is known to add acid compounds as stabilisers. Such additives are intended mainly for excluding the harmful influence of basic decomposition products of the dimethyl formamide serving as solvent. However, since industrial processes which enable the production of very pure dimethyl formamide are known, the range of application of the said stabilisers is greatly restricted. Furthermore, it is not possible to obtain completely colourless polymer solutions using these additives.

In this connection, it should be pointed out that the yellowing of polyacrylonitrile solutions is attributed to other chemical reactions than, for example, a yellowing of polyvinyl chloride solutions. Polyvinyl chloride solutions can be stabilised with compounds which act as hydrogen chloride acceptors. Such compounds, however, cause a particularly strong yellowing with polyacrylonitrile solutions. Similarly, the yellowing of diolefine polymers and diolefine copolymers, which is prevented by conventional radical absorbers (such as phenol) is based on a different mechanism than the browning of polyacrylonitrile solutions. Practically no olefinically unsaturated carbon double bonds are present in polyacrylonitrile. The attachment points for allowing a cross-linking or an oxidising reaction do not exist with polyacrylonitrile polymer solutions.

On account of the different natures of the degradation mechanisms, the stabilisers effective for the individual polymers are specific for such polymers. Stabilisers which are for example very effective with polyvinyl chloride solutions prove to be completely ineffective with polyacrylonitrile solutions.

It is an object of the present invention to provide solutions of acrylonitrile polymers in organic solvents which show a particularly low degree of yellowing. An additional object is to make available particularly effective stabilisers for the production of such solutions. Further objects will be apparent from the following description and the examples.

It has now been found that solutions in organic solvents of acrylonitrile polymers with a high proportion of combined acrylonitrile can be stabilised against yellowing in a particularly satisfactory manner by adding stabilisers, if the stabilisers used are mercaptotriazoles of the general Formula I

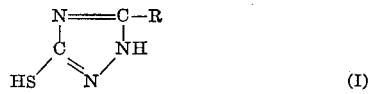

(I)

In the general Formula I, R is a hydrogen atom or an alkyl, aryl or heterocyclic radical. R advantageously is an alkyl radical which contains 1–4 carbon atoms, such as methyl, ethyl, isopropyl and n-butyl, or a phenyl radical or furoyl radical.

It is surprising that compounds of the general Formula I, which as such are not outstanding mercaptans, have a better effect as stabilisers than compounds such as thioglycol. Compounds of the general Formula I react in accordance with the Formula II, as shown, if a titration with iodine solution is carried out.

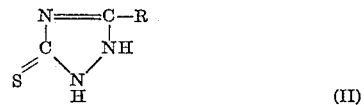

(II)

While thioglycol consumes the calculated quantity of iodine in the titration, only an iodine consumption of 33% of the theoretically calculated quantity is found with I-H,3-mercapto-1,2,4-triazole. By comparison with the conventional mercaptans, compounds of the general Formula I have the advantage that a nuisance due to odour does not occur and the compounds are far more stable to the action of oxidising agents, while very readily transforming mercaptans into disulphides. The compounds according to the invention are known and they are obtained by processes known per se, for example by dehydrating acylated thiosemicarbazides. The mercaptotriazoles have an adequate solubility in dimethyl formamide. Particularly effective examples of these stabilisers are the following: 3-mercapto-1,2,4-triazole and 5-methyl-3-mercapto-1,2,4-triazole, as well as those 3-mercapto-1,2,4-triazoles which contain an ethyl, phenyl or furoyl radical in the 5 position.

The acrylonitrile polymers can be homopolymers or copolymers of acrylonitrile. However, they always contain a predominant proportion of combined acrylonitrile. The conventional comonomers are considered as co-operating component for the production of such polymers and examples are acrylic and methacrylic acid esters, vinyl acetate, acrylamides, methacrylamides, methylvinyl ketone, styrene, vinyl pyridine, styrene, sulphonic acid, acrylic acid and methacrylic acid. Acrylonitrile polymers with at least 80% of combined acrylonitrile are preferably used.

The conventional high-polar solvents, such as dimethyl formamide, dimethyl acetamide and ethylene glycol carbonate, are used as solvents for the production of the solutions according to the invention.

The polymer solutions according to the invention are generally prepared at temperatures between 10 and 100° C., and advantageously between 30 and 80° C.

The production of the polymer solutions is effected in principle in a manner known per se. The content of polymer in the solution is between 5 and 35%.

The amount of stabiliser can range within wide limits and is generally between 0.01 and 5% by weight based on the polymer preferably between 0.05 and 3%.

The quantity of stabiliser depends on the degree of purity of the solvent being used, on the duration of the dissolving process, the temperature and generally only to an unimportant degree on the composition of the polymer. The most desirable concentrations can easily be established by preliminary tests. The addition of the stabilisers during the dissolving process can be effected by combining a highly concentrated stock solution by way of a proportioning device with the solvent for the polymer or with the solution to be produced, in a dissolving worm or a dissolving vessel. The said stabilisers can also be introduced into the solvent jointly with the polymer. The stabilisers can also be added during the dissolving process.

The solutions obtained can be supplied for the shaping process directly or after deaeration or filtration.

The stabilised solutions obtained according to the invention show a number of advantages over the previously known solutions. Despite the use of conventional dissolving conditions, they are colourless and can also be stored for a relatively long period, possibly at relatively high temperatures, without any yellowing being found or any gel elements being formed. The superiority of the solutions stabilised according to the invention over unstabilised solutions is clearly apparent from the following examples.

The present invention is further disclosed in the following examples, which are illustrative but not limitative thereof.

*Example 1*

30 parts by weight of acrylonitrile copolymer, which consists of 95 parts by weight of acrylonitrile and of 5 parts by weight of methyl acrylate, are finely powdered together with 0.15 part by weight of 3-mercapto-1,2,4-triazole and dissolved in 100 parts by weight of dimethyl formamide at 40° C. A complete solution is produced by the temperature of the mixture being raised within 30 minutes to 60° C. After the polymer solution has been heat-treated at 130° C., there is only a very slight yellowing of the solution. A strongly yellow-coloured polymer solution is obtained when the stabiliser is not added.

*Example 2*

In order to enable the yellowing process to be followed quantitatively with rising temperatures, 5% polymer solutions were used. Such polymer solutions show a low viscosity and can be easily introduced into measuring flasks.

5% solutions in dimethyl formamide are prepared with a copolymer consisting of 95% of acrylonitrile and 5% of methyl acrylate. Mercaptotriazoles are added as stabilisers to these solutions, as will be seen from the following table. Thereafter, the polymer solutions are heated for 30 minutes to 90° C. and then the yellowing is measured optically. An additional heat treatment follows for 1 hour at 130° C. and thereafter the degree of yellowing is again measured optically. The optical measurements are carried out in the Elco-Photometer III of Messrs. Zeiss at λ=470μ. The measurement results are converted to those for a layer 5 cm. thick.

TABLE

| Stabilisers | Extinction prior to thermal treatment | Extinction after a heat treatment of 30 min. at 90° C. | Extinction after a heat treatment of 30 min. at 90° C and 1 hour at 130° C. |
|---|---|---|---|
| Without stabiliser | 0.060 | 0.070 | 0.460 |
| With 1% stabiliser [1] | 0.064 | 0.072 | 0.173 |
| With 0.5% stabiliser [1] | 0.060 | 0.070 | 0.163 |
| With 1% stabiliser [2] | 0.057 | 0.075 | 0.165 |

[1] I-H,-3-mercapto-1,2,4-triazole.
[2] I-H,-5-methyl-3-mercapto-1,2,4-triazole.

As is apparent from the table, a specimen of polymer, without addition of the stabilisers according to the invention, shows an extinction of 0.460 after the thermal treatment. A specimen containing 0.5% of stabiliser 1 as additive shows an extinction of 0.163 after the thermal treatment.

The extinction values are a standard for the degree of yellowing.

We claim:

1. A stabilized solution of an acrylonitrile polymer with a high proportion of bound acrylonitrile in an organic solvent containing as stabilizer a I-H,-3-mercaptotriazole of the formula

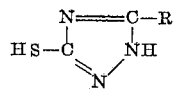

in which R is a member selected from the group consisting of hydrogen, alkyl, aryl and heterocyclic radicals.

2. Stabilized solution according to claim 1, wherein the mercaptotriazole is present in quantities of 0.01 to 5% by weight, based on the polymer.

3. Stabilized solution of an acrylonitrile polymer with a high proportion of bound acrylonitrile in an organic solvent containing as stabilizer I-H,-3-mercapto-1,2,4-triazole.

4. Stabilized solution of an acrylonitrile polymer with a high proportion of bound acrylonitrile in an organic solvent containing as stabilizer I-H,-5-methyl-3-mercapto-1,2,4-triazole.

5. A solution of 30 parts by weight of acrylonitrile copolymer which consists of 95 parts by weight of bound acrylonitrile and of 5 parts by weight of bound methylacrylate in 100 parts by weight of dimethyl formamide containing as stabilizer from 0.05 to 3% by weight, based on the monomer of I-H,-3-mercapto-1,2,4-triazole.

6. A solution of 30 parts by weight of acrylonitrile copolymer which consists of 95 parts by weight of bound acrylonitrile and of 5 parts by weight of bound methacrylate in 100 parts by weight of dimethylformamide containing as stabilizer from 0.05 to 3% by weight, based on the monomer of I-H,-5-methyl-3-mercapto-1,2,4-triazole.

References Cited by the Examiner

UNITED STATES PATENTS

| 2,751,370 | 6/1956 | Roussel | 260—45.8 |
| 2,944,998 | 7/1960 | Buxbaum | 260—45.8 |
| 3,004,896 | 10/1961 | Heller | 260—45.9 |
| 3,154,511 | 10/1964 | Logemann et al. | 260—45.9 |

FOREIGN PATENTS 956,095 7/1962 Great Britain.

LEON J. BERCOVITZ, *Primary Examiner.*